United States Patent
Tsai

(10) Patent No.: US 8,541,908 B2
(45) Date of Patent: Sep. 24, 2013

(54) POWERED DEVICE CAPABLE OF WORKING IN CONTINUATION IN CASE OF POWER FAILURE

(75) Inventor: Kun-Tan Tsai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 329 days.

(21) Appl. No.: 12/650,770

(22) Filed: Dec. 31, 2009

(65) Prior Publication Data

US 2011/0119506 A1 May 19, 2011

(30) Foreign Application Priority Data

Nov. 19, 2009 (CN) .......................... 2009 1 0309988

(51) Int. Cl.
*H02J 1/10* (2006.01)
(52) U.S. Cl.
USPC .......................................................... 307/52
(58) Field of Classification Search
USPC ................. 307/43, 52, 54; 713/300; 710/15, 710/62
See application file for complete search history.

(56) References Cited

U.S. PATENT DOCUMENTS

| 5,991,885 A * | 11/1999 | Chang et al. ................... 713/300 |
| 6,441,594 B1 * | 8/2002 | Connell et al. ................ 323/274 |
| 2008/0104427 A1 * | 5/2008 | Yee et al. ....................... 713/300 |

FOREIGN PATENT DOCUMENTS

TW M350186 2/2009

OTHER PUBLICATIONS

Geoger Chales Electronic Circuit Network, Details of Current Source, Geoger Chales Electronic Circuit Network, Jan. 18, 2008, 1/4, Fig. 1, Geoger Chales Electronic Circuit Network, http://gc.digitw.com/DATA-DOC/ConstCurReg.pdf.

* cited by examiner

*Primary Examiner* — Jue Zhang
*Assistant Examiner* — Henry Lee, III
(74) *Attorney, Agent, or Firm* — Altis & Wispro Law Group, Inc.

(57) ABSTRACT

An exemplary powered device (PD) connected to a local power source and a power sourcing equipment (PSE) includes a constant current source drawing at least 10 mA direct current from the PSE when the local power source is in operation. The PD includes a first conversion circuit, a first diode, and a second diode. The first conversion circuit comprises a first input and is configured for converting a voltage input to the first input into the rated working voltage of the PD. The positive terminal of the first diode is connected to the local power source and the negative terminal thereof is connected to the first input. The voltage of the local power source is higher than that of the PSE.

4 Claims, 2 Drawing Sheets

POWERED DEVICE CAPABLE OF WORKING IN CONTINUATION IN CASE OF POWER FAILURE

BACKGROUND

1. Technical Field

The disclosure relates to power over Ethernet (PoE) technology and, particularly, to a powered device (PD).

2. Description of Related Art

Generally, Ethernet switches, routers, hubs, and other Ethernet powered devices (PDs) can be connected to a local power supply for continuous power. In addition, the PD can be connected to power sourcing equipment (PSE) which includes a backup battery for temporary power, which uses power over Ethernet (PoE) technology during failure of the local power supply.

PoE technology, as proposed by the Institute of Electrical and Electronics Engineers (IEEE), must comply with the IEEE 802.3af standard. Currently, when the PD is powered by the local power supply, the PSE typically functions in an idle mode. In the idle mode, the PSE continues detecting if any functioning PD is loaded thereto every two seconds, and classifies the power of the functioning PD, if detected. Then, the PSE is switched to a normal mode for a normal power supply. Accordingly, it can take as long as four seconds to resume normal power supply from the PSE. During the delay, communication via the PD is unavoidably interrupted.

Therefore, it is desirable to provide a protection circuit and a PD, which can overcome the limitations described.

DETAILED DESCRIPTION

Figure 1:
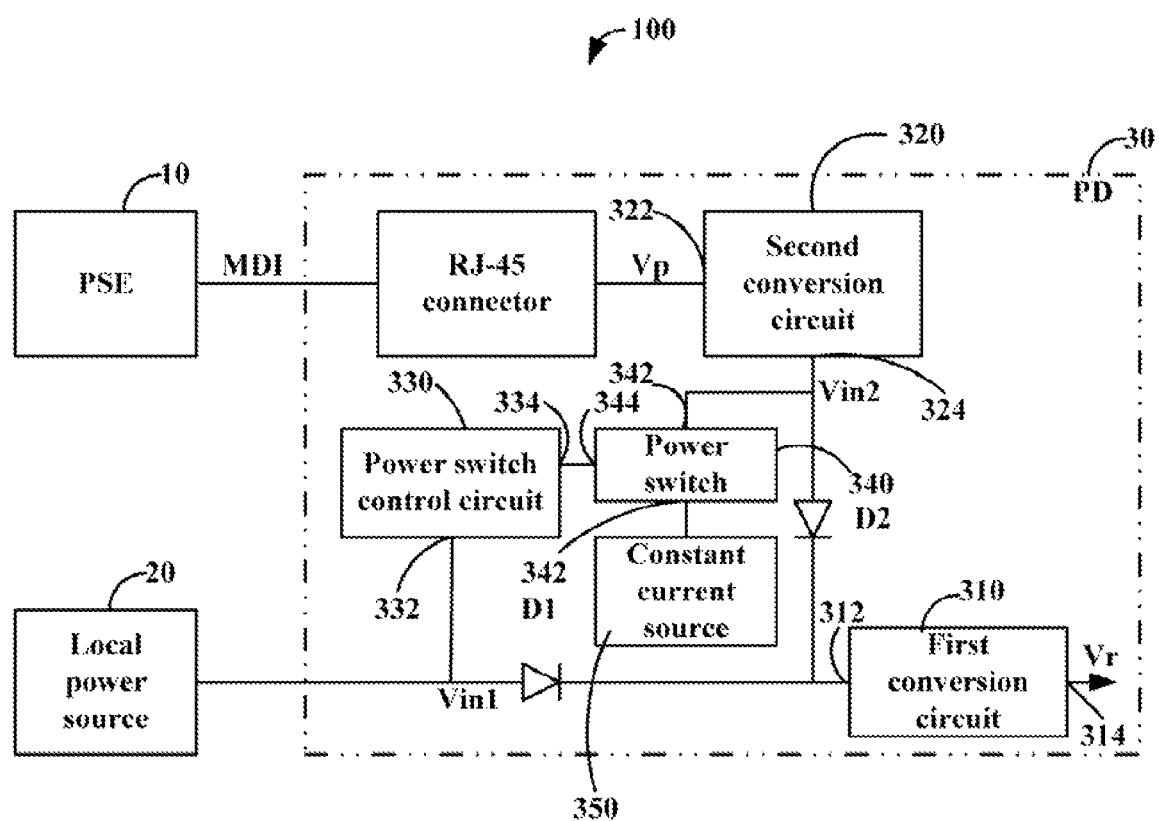
FIG. 1 is a functional block diagram of one embodiment of a powered device (PD) connected to a local power source and a power sourcing equipment.

Referring to FIG. 1, one embodiment of a power over Ethernet (PoE) system 100 includes power sourcing equipment (PSE) 10, a local power source 20, and a powered device (PD) 30. The PD 30 includes a first conversion circuit 310, a first diode D1, a second conversion circuit 320, a second diode D2, a power switch control circuit 330, a power switch 340, and a constant current source (e.g., a current sink) 350.

The first conversion circuit 310 includes a first input 312 and a first output 314. The first conversion circuit 310 is configured for converting a voltage input to the first input 312 into a rated working voltage Vr of the PD 30 and outputting the rated working voltage Vr via the first output 314 to power the PD 30. The positive terminal of the first diode D1 is connected to the local power source 20 and the negative terminal thereof is connected to the first input 312. The local power source 20 provides a power input with a first input voltage Vin1 to the first diode D1.

The second conversion circuit 320 includes a second input 322 and a second output 324. The second conversion circuit 320 is configured for converting a voltage input to the second input 322 into a second input voltage Vin2 and outputting the second input voltage Vin2 via the second output 324. The second input 322 is connected to the PSE 10. The PSE 10 provides a power input having a predetermined voltage Vp to the second input 322. In detail, the PSE 10 is connected to the second input 322 through a media dependent interface (MDI) and an RJ-45 connector. The positive terminal of the second diode D2 is connected to the second output 324 and the negative terminal thereof is connected to the first input 312.

The first input voltage Vin1 is higher than the second input voltage Vin2. Therefore, when the local power source 20 is functional, the first diode D1 is forward biased and the second diode D2 is reverse biased. Electrical connection between the local power source 20 and the first input 312 is established while the electrical path from the second output 324 to the first input 312 is blocked by the reverse-biased second diode D2. The PD 30 is powered by the local power source 20 rather than the PSE 10.

In one embodiment, the rated working voltage Vr may be about 3.3V, the first input voltage Vin1 may be about 12V, the second input voltage Vin2 may be about 10V, and the predetermined voltage Vp may be about 48V.

The power switch control circuit 330 includes a power terminal 332 and a control terminal 334. The power terminal 332 is connected to the local power source 20. The power switch control circuit 330 is configured for outputting a connection control signal when the power terminal 332 obtains a high level input from the local power source 20 (i.e., the local power source 20 works properly), or outputting a disconnection control signal when the power terminal 332 gets a low level input from the local power source 20 (i.e., the local power source 20 fails).

The power switch 340 includes two connection terminals 342 and an enable terminal 344. The two connecting ends 342 are respectively connected to the second output 324 and the constant current source 350. The enable terminal 344 is connected to the control terminal 334. The power switch 340 enables power transmission between the two connection terminals 342 so that the constant current source 350 can draw power, that is current from the PSE 10 when the enable terminal 344 receives the connection control signal, or disables power transmission between the two connection terminals 342 when the enable terminal 344 receives the disconnection control signal.

According to the IEEE 802.3af standard, to maintain a PSE in a normal mode (one in which the PSE can provide normal power supply), the PD(s) is required to present a maintain power signal (MPS) to the PSE 10. The MPS can be, for example, draw of at least 10 mA direct current from the PSE by the PD. Thus, as long as the constant current source 350 draws at least 10 mA direct current, the PSE 10 is maintained in normal mode, in which power is provided to the PD 30 in continuation from the PSE 10 once the power local source 20 is down. That is, when the local power source 20 fails (e.g., an interrupted operation), the first diode D1 becomes reverse-biased, and the second diode D2 becomes forward-biased. Interrupted service to the PD 30 is enabled.

To reduce power consumption of PSE 10, the constant current source 350 draws as small as possible exceeding 10 mA direct current from the PSE 10. In this embodiment, the constant current source 350 draws slightly more than 10 mA direct current from the PSE 10.

After the failure of the local power source 20, the power terminal 332 of the power switch control circuit 330 receives the low level input. Accordingly, the control terminal 334 outputs the disconnection control signal. The power switch 340 disables power transmission between the two connection terminals 342 since the enable terminal 344 receives the disconnection control signal from the control terminal 334. The constant current source 350 no longer draws power from the PSE 10. This also helps to reduce the power consumption of the PSE 10. To simplify the circuit of the PD 30 and reduce cost thereof, in alternative embodiments, the power switch control circuit 330 and power switch 340 can be omitted, whereby the constant current source 350 is directly connected to the second output 324.

Figure 2:
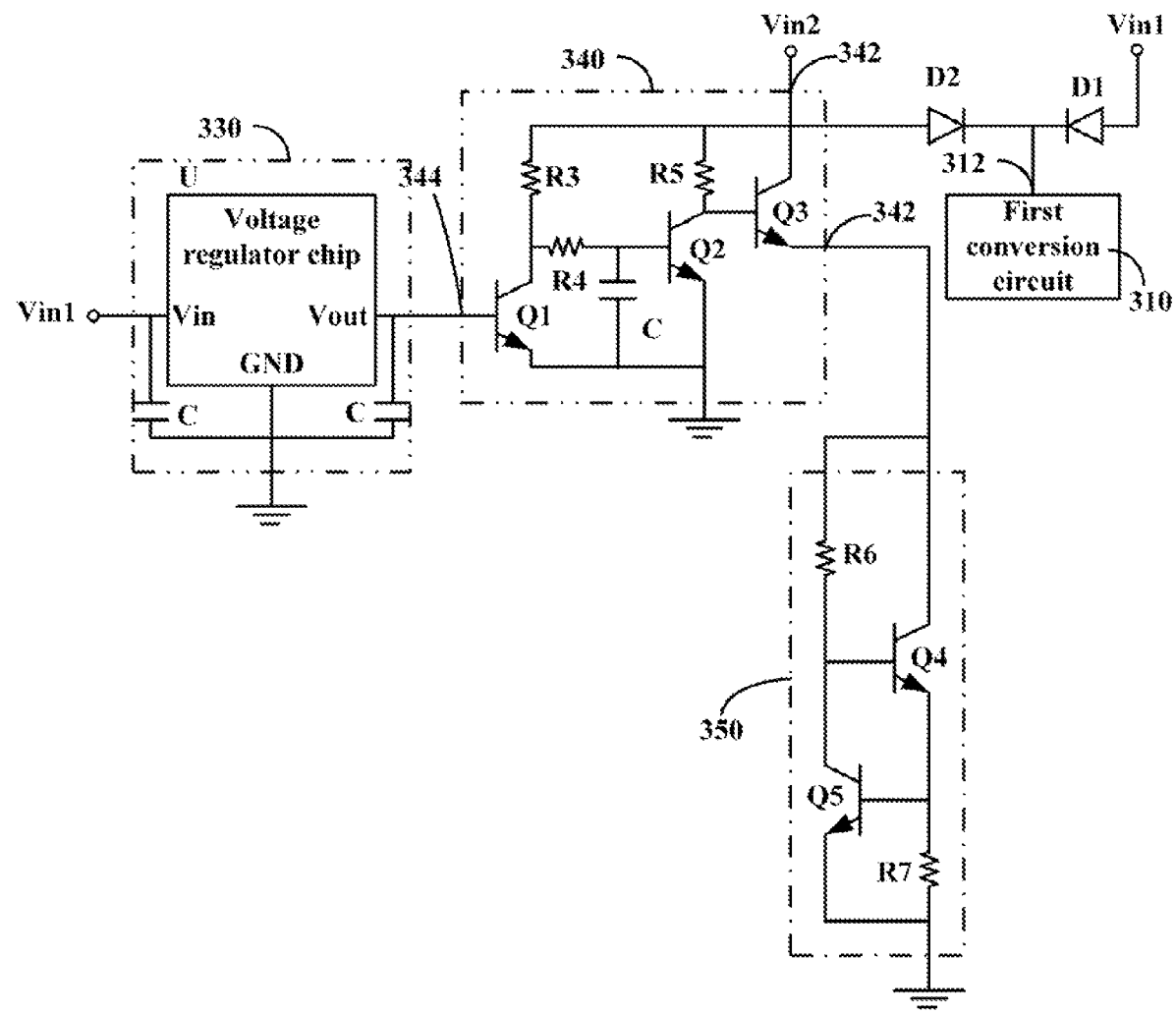
FIG. 2 is a circuit diagram of one embodiment of the PD, such as, for example, that of FIG. 1.

Referring to FIG. 2, the power switch control circuit 330 includes a voltage regulator chip U (e.g., 78D05L). The voltage regulator chip U includes an input Vin, an output Vout, and a ground terminal GND. The voltage regulator chip U is configured for converting the first voltage input Vin1 input thereto by the input Vin into an enable signal Vsw and outputting the enable signal Vsw via the output Vout. The input Vin of the voltage regulator chip U is the power terminal 332 of the power switch control circuit 330. The output Vout of the voltage regulator chip U is the control terminal 334 of the power switch control circuit 330. When the enable signal Vsw is high, such as about 5V, the enable signal Vsw is the connection control signal. When the enable signal Vsw is low, such as about 0V, the enable signal Vsw is the disconnection control signal. In particular, the power switch control circuits 330 may also include two bypass capacitors C. The input Vin and the output Vout of the voltage regulator chip U are connected to ground by the two bypass capacitors C respectively.

The power switch 340 includes a first npn transistor Q1, a third resistor R3, a fourth resistor R4, a bypass capacitor C, a second npn transistor Q2, a fifth resistor R5, and a third npn transistor Q3. The base of the first npn transistor Q1 is the enable terminal 344 and is connected to the output Vout of the voltage regulator chip U. The collector of the first npn transistor Q1 is connected to the PSE 10 through the third resistor R3. The emitter of the first npn transistor Q1 is grounded. The base of the second npn transistor Q2 is connected to the collector of the first npn transistor Q1 through the fourth resistor R4 and is also connected to ground via the bypass capacitor C. The collector of the second npn transistor Q2 is connected to the base of the third npn transistor Q3. The emitter of the second npn transistor Q2 is grounded. The collector of the third npn transistor Q3 is one of the connection terminals 342 of the power switch 340, connected to the PSE 10. The emitter of the third npn transistor Q3 is another connection terminal 342, connected to the constant current source 350. In operation, when the enable signal Vsw is high, that is the connection control signal, the first npn transistor Q1 turns on, the second npn transistor Q2 turns off, and the third npn transistor Q3 turns on. That is, the two connection terminals 342 of the power switch 340 are connected. When the enable signal Vsw is low, that is the disconnection control signal, the first npn transistor Q1 turns off, the second npn transistor Q2 turns on, and the third npn transistor Q3 turns off. That is, the two connection terminals 342 of the power switch 340 are disconnected.

The constant current source 350 is a current negative feedback circuit, which includes a sixth resistor R6, a fourth npn transistor Q4, a fifth npn transistor Q5, and a seventh resistor R7. The collector of the fourth npn transistor Q4 is connected to one of the connection terminals 342 of the power switch 340, that is the emitter of the third npn transistor Q3. The base of the fourth npn transistor Q4 is also connected to the connection terminal 342 of the power switch 340 via the sixth resistor R6. The emitter of the fourth npn transistor Q4 is connected to ground through a seventh resistor R7. The collector of the fifth npn transistor Q5 is connected to the base of the fourth npn transistor Q4. The base of the fifth npn transistor Q5 is connected to the emitter of the fourth npn transistor Q4. The emitter of the fifth npn transistor Q5 is grounded. In operation, when the current through the seventh resistor R7 increases, the voltage of the base of the fifth npn transistor Q5 increases accordingly. The current through the sixth resistor R6 increases due to the current amplification effect of the fifth npn transistor Q5, resulting in a smaller voltage of the base of the fourth npn transistor Q4. As such, the current through the base of the fourth npn transistor Q4 decreases. The current through the collector of the fourth npn transistor Q4 decreases due to the current amplification effect of the fourth npn transistor Q4. Consequently, the current through the seventh resistor R7 decreases. The opposite happens when the current through the seventh resistor R7 increases. That is, the current through the seventh resistor R7 is locked.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A powered device, the powered device being connected to a local power source and a power sourcing equipment, the powered device, comprising
a first conversion circuit comprising a first input and configured for converting a voltage input to the first input into the rated working voltage of the powered device;
a first diode, wherein the positive terminal of the first diode is connected to the local power source for normal power supply and the negative terminal of the first diode is connected to the first input;
a second diode, wherein the positive terminal of the second diode is connected to the power sourcing equipment for temporary power supply via power over Ethernet technology and the negative terminal of the second diode is connected to the first input, the voltage of the local power source exceeding that of the power sourcing equipment;
a constant current source, the constant current source being configured for drawing at least 10 mA direct current from the power sourcing equipment when the powered device is powered by the local power source;
wherein the constant current source comprises a sixth resistor, a fourth npn transistor, a fifth npn transistor, and a seventh resistor, the collector of the fourth npn transistor being connected to one of the connection terminals of the power switch, the base of the fourth npn transistor being connected to the connection terminal the power switch via the sixth resistor, the emitter of the fourth npn transistor being connected to ground through a seventh resistor, the collector of the fifth npn transistor being connected to the base of the fourth npn transistor, the base of the fifth npn transistor being connected to the emitter of the fourth npn transistor, the emitter of the fifth npn transistor being grounded.

2. The powered device of claim 1, further comprising a power switch control circuit and a power switch, the power switch control circuit comprising a power terminal and a control terminal, the power terminal being connected to the local power source, the power switch control circuit being configured for outputting a connection control signal when the power terminal gets a high level input from the local power source or outputting a disconnection control signal when the power terminal gets a low level input from the local power source, the power switch comprising two connection terminals and an enable terminal, the two connecting ends being respectively connected to the power sourcing equipment and the constant current source, the enable terminal being connected to the control terminal, the power switch being configured for enabling power transmission between the two connection terminals when the enable terminal receives the connection control signal, or disabling power transmission between the two connection terminals when the enable terminal receives the disconnection control signal.

3. The powered device of claim 2, wherein the power switch control circuit comprises a voltage regulator chip and two bypass capacitors, the voltage regulator chip comprising an input functioning as the power terminal, an output functioning as the control, and a ground terminal, the input and the output being connected to ground via the capacitors respectively.

4. The powered device of claim 2, wherein the power switch comprises a first npn transistor, a third resistor, a fourth resistor, a bypass capacitor, a second npn transistor, a fifth resistor, and a third npn transistor, the base of the first npn transistor being connected to the control terminal, the collector of the first npn transistor being connected to the PSE through the third resistor, the emitter of the first npn transistor being grounded, the base of the second npn transistor being connected to the collector of the first npn transistor through the fourth resistor and connected to ground via the bypass capacitor, the collector of the second npn transistor being connected to the base of the third npn transistor, the emitter of the second npn transistor being grounded, the collector of the third npn transistor being connected to the PSE, the emitter of the third npn transistor being connected to the constant current source.

* * * * *